(12) United States Patent
Tamura

(10) Patent No.: US 9,009,507 B2
(45) Date of Patent: Apr. 14, 2015

(54) INFORMATION PROCESSING APPARATUS AND METHOD OF CONTROLLING THE SAME

(75) Inventor: Satoshi Tamura, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 415 days.

(21) Appl. No.: 13/419,145

(22) Filed: Mar. 13, 2012

(65) Prior Publication Data

US 2013/0007496 A1    Jan. 3, 2013

(30) Foreign Application Priority Data

Jun. 30, 2011   (JP) ................................ 2011-146327

(51) Int. Cl.
   *G06F 1/32*   (2006.01)
   *G06F 1/16*   (2006.01)

(52) U.S. Cl.
   CPC ............ *G06F 1/1677* (2013.01); *G06F 1/3206* (2013.01); *G06F 1/3234* (2013.01); *Y02B 60/32* (2013.01)

(58) Field of Classification Search
   None
   See application file for complete search history.

(56) References Cited

U.S. PATENT DOCUMENTS

| 7,480,813 | B2 | 1/2009 | Asoh et al. |
| 2005/0278557 | A1 | 12/2005 | Asoh et al. |
| 2006/0047980 | A1* | 3/2006 | Price et al. .................... 713/300 |
| 2010/0223026 | A1* | 9/2010 | Witte et al. .................... 702/150 |
| 2012/0072752 | A1* | 3/2012 | Kennedy et al. ............. 713/323 |

FOREIGN PATENT DOCUMENTS

| JP | 2001-042978 | 2/2001 |
| JP | 2005352897 | 12/2005 |
| JP | 2007034971 | 2/2007 |
| JP | 2008-129833 | 6/2008 |
| JP | 2010146503 | 7/2010 |

OTHER PUBLICATIONS

Japanese Patent Application No. 2011-146327, First Office Action, mailed May 22, 2012, (with English Translation).

* cited by examiner

*Primary Examiner* — Paul Yanchus, III

(74) *Attorney, Agent, or Firm* — Blakely, Sokoloff, Taylor & Zafman LLP

(57) ABSTRACT

According to one embodiment, a method controls an apparatus including a sensor which detects an open/close state of a cover, and an power manager which performs power management of the apparatus in accordance with a ordinary state and a power-saving state. The method includes notifying turning on the apparatus in order to change the apparatus to the ordinary state, if the power manager is notified a second notifying and the sensor detects that the cover is opened, and performing an power management corresponding to the power-saving state, if the power manager is notified a first notifying, or if the power manager is notified the second notifying and the sensor detects that the cover is closed.

10 Claims, 6 Drawing Sheets

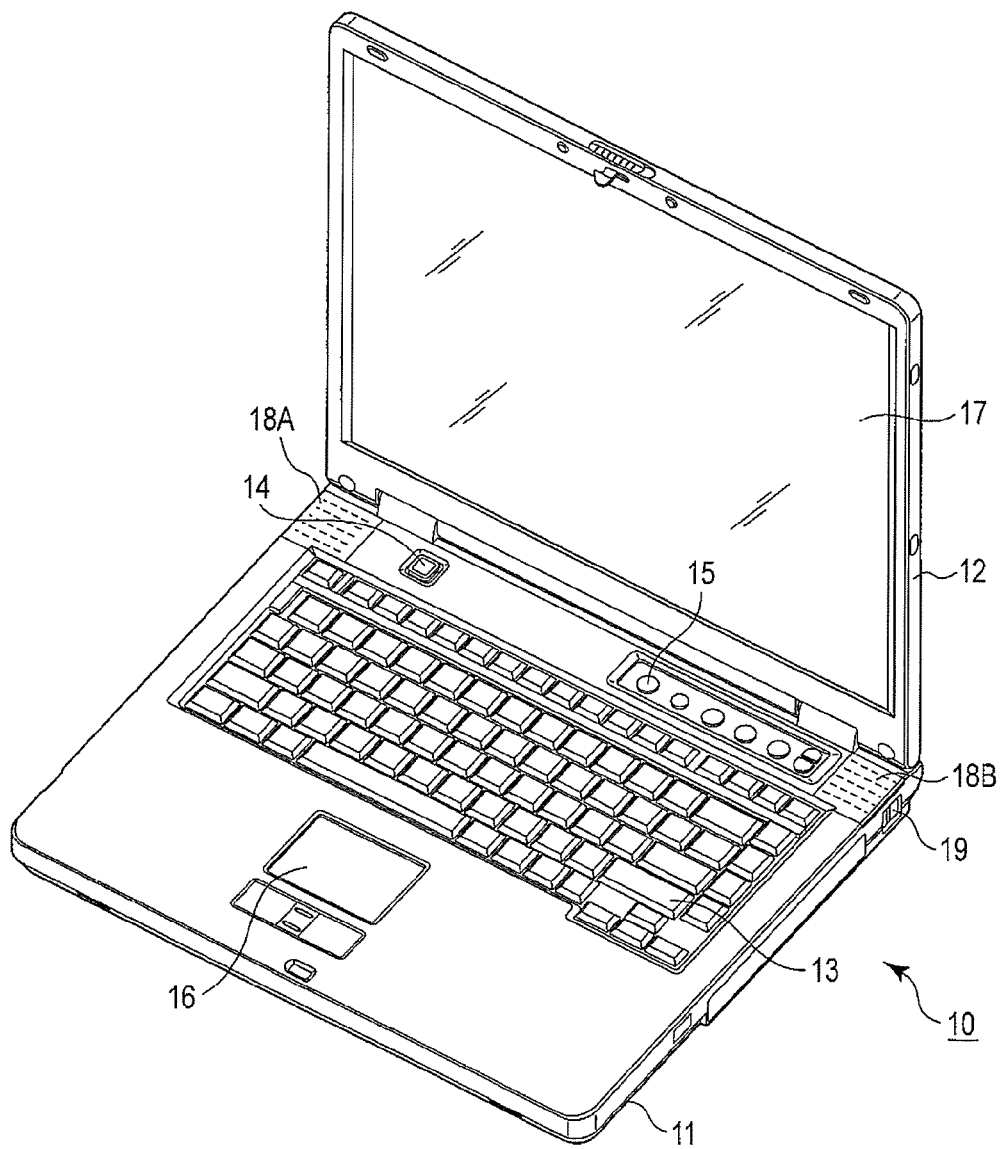
F I G. 1

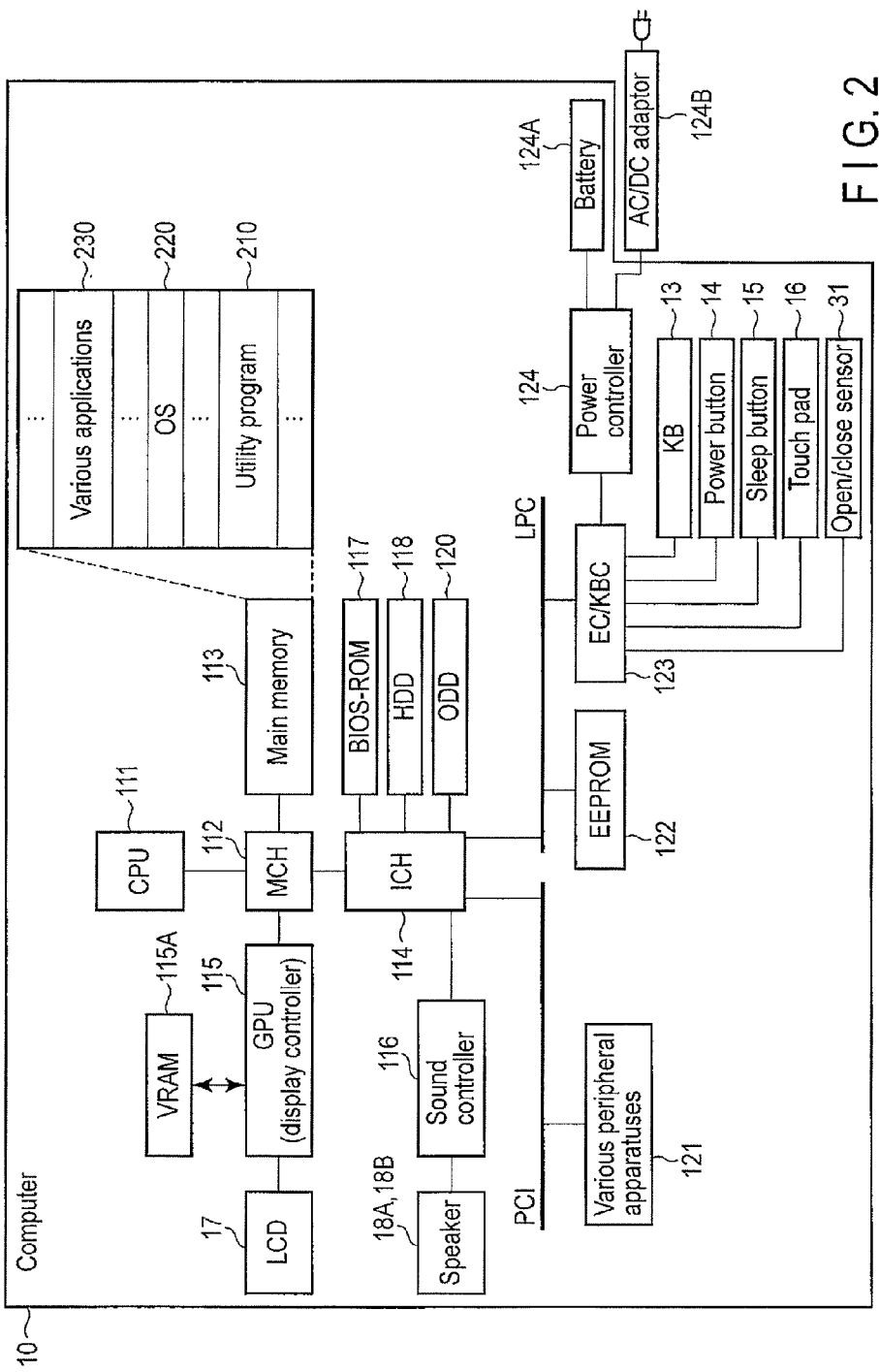
F I G. 2

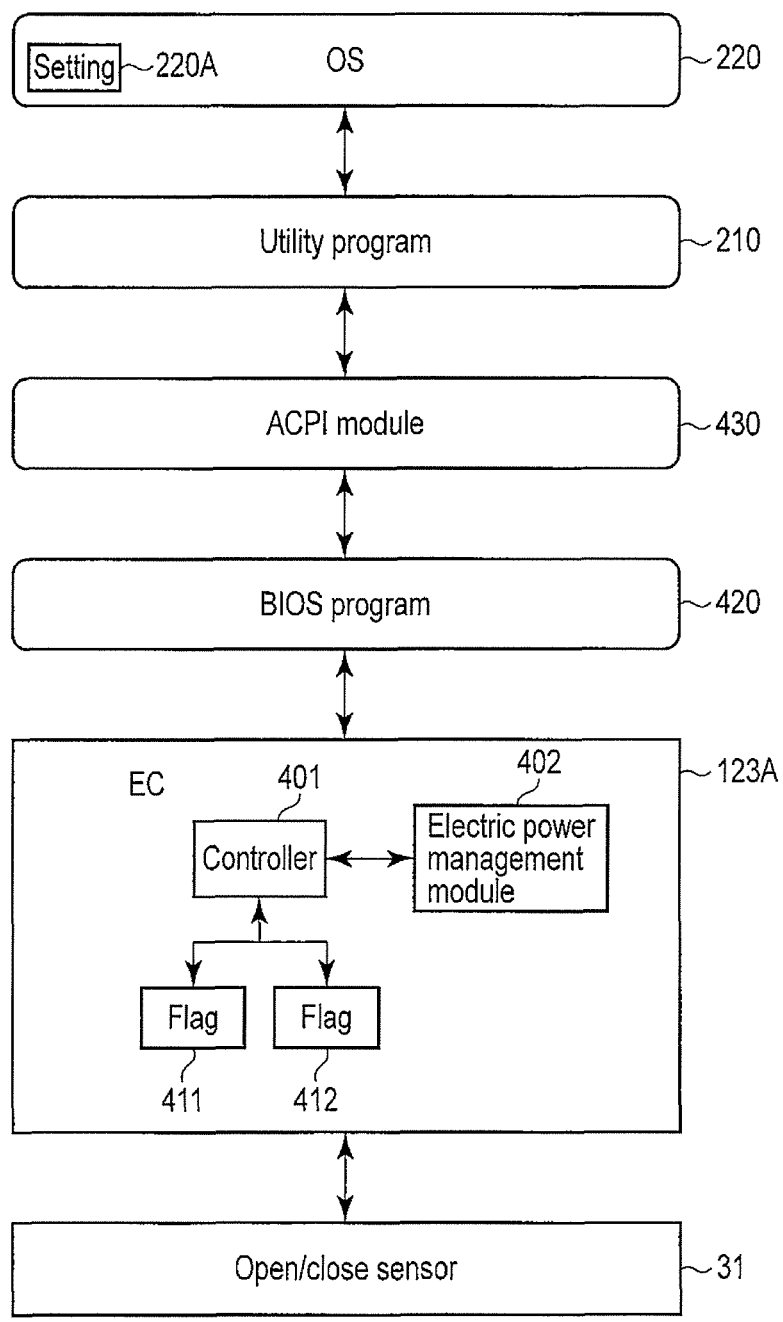
F I G. 4

INFORMATION PROCESSING APPARATUS AND METHOD OF CONTROLLING THE SAME

CROSS-REFERENCE TO RELATED APPLICATIONS

This application is based upon and claims the benefit of priority from prior Japanese Patent Application No. 2011-146327, filed Jun. 30, 2011, the entire contents of which are incorporated herein by reference.

FIELD

Embodiments described herein relate generally to an information processing apparatus, which is capable of changing to a power-saving state by closing a cover, and a method of controlling the information processing apparatus.

BACKGROUND

For example, portable notebook personal computers can automatically be changed to a sleep mode when the display unit is closed. However, even when the user closes the display unit by mistake, the computers are automatically changed to the sleep mode. Therefore, it is required for the computers to return to an ordinary state by opening the display unit, after the display unit is closed by mistake.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is an exemplary perspective view of an example of an external appearance of an information processing apparatus according to an embodiment.

FIG. 2 is an exemplary block diagram illustrating an example of a configuration of the information processing apparatus according to the embodiment.

FIG. 4 is an exemplary block diagram illustrating an example of a structure to change the apparatus to a power-saving state when the display unit is closed.

DETAILED DESCRIPTION

Figure 3:
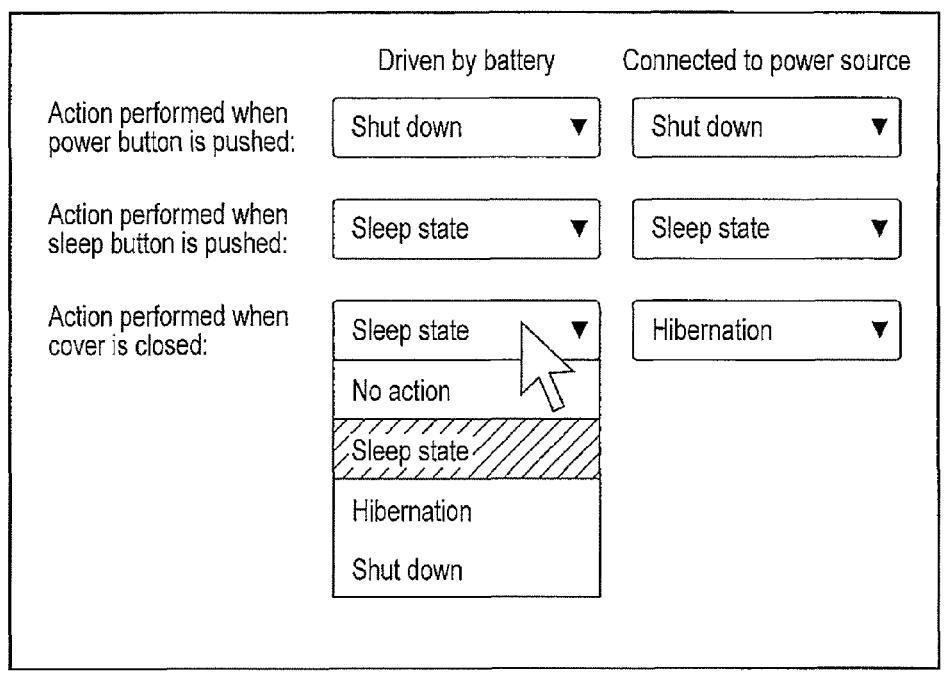
FIG. 3 is an exemplary diagram illustrating an example of a setting picture, which is displayed on an LCD of the information processing apparatus of the embodiment, to set actions performed when a display unit is closed.

Various embodiments will be described hereinafter with reference to the accompanying drawings.

In general, according to one embodiment, an information processing apparatus which has an ordinary state and a power-saving state that has a power consumption lower than that of the ordinary state, the apparatus includes a body, a cover, a sensor, an electric power management module, a first notifying module, a second notifying module, and a third notifying module. The cover is supported by the body, and capable of being opened and closed with respect to the body. The sensor is configured to detect an open/close state of the cover. The electric power management module is configured to perform electric power management of the apparatus in accordance with the ordinary state and the power-saving state. The first notifying module is configured to notify the electric power management module that the apparatus is changed to the power-saving state since the cover is closed, if the sensor detects that the cover is closed and an action to be performed when the cover is closed indicates change to the power-saving state. The second notifying module is configured to notify an operating system that the cover is closed, when the sensor detects that the cover is closed. The third notifying module is configured to notify the electric power management module to change the apparatus to the power-saving state, when processing which is performed by the operating system to change the apparatus to the power-saving state in response to notification from the second notifying module is finished. The electric power management module is configured to notify turning on the apparatus in order to change the apparatus to the ordinary state, if the third notify module notifies the electric power management module to change to the power-saving state and the sensor detects that the cover is opened. The electric power management module is configured to perform an electric power management corresponding to the power-saving state, if the first notifying module notifies the electric power management module to change to the power-saving state, or if the third notifying module notifies the electric power management module to change to the power-saving state and the sensor detects that the cover is closed.

First, a structure of a playback apparatus according to an embodiment will be explained hereinafter, with reference to FIG. 1 and FIG. 2. The playback apparatus of the embodiment is realized by, for example, a portable notebook personal computer 10 which functions as an information processing apparatus.

FIG. 1 is a perspective view of the computer 10 in a state where a display unit (cover) is opened. The computer 10 comprises a computer main body 11, and a display unit 12. A display device which is formed of a TFT-LCD (Thin Film Transistor Liquid Crystal Display) 17 is incorporated in the display unit 12. In the following explanation, the display unit 12 is also referred to as LID 12.

The display unit 12 is attached to the computer main body 11 such that the display unit 12 is rotatable between an open position, in which an upper surface of the computer main body 11 is exposed, and a closed position in which the display unit 12 covers the upper surface of the computer main body 11. The computer main body 11 includes a housing which has a thin box shape. A keyboard 13, a power button 14 to turn on/off the power of the computer 10, a sleep button 15 to change the computer 10 to a sleep mode, a touch pad 16, and speakers 18A and 183 are arranged on the upper surface of the computer main body 11.

Next, a system configuration of the computer 10 will be explained hereinafter with reference to FIG. 2.

As illustrated in FIG. 2, the information processing apparatus comprises a CPU (Central Processing Unit) 111, an MCH (Memory Controller Hub) 112, a main memory (volatile memory) 113, an ICH (I/O Controller Hub) 114, a GPU (Graphics Processing Unit) 115, a video memory (VRAM) 115A, a sound controller 116, a BIOS-ROM (Basic Input/Output System—Read Only Memory) 117, an HDD (Hard Disk Drive) (storage device) 118, an ODD (Optical Disk Drive) 120, various peripheral apparatuses 121, an EEPROM (Electrically Erasable Programmable ROM) 122, an EC/KBC (Embedded Controller/Keyboard Controller) 123, and an open/close sensor 31.

The CPU 111 is a processor which controls operation of the information processing apparatus, and executes various programs which are loaded from the HDD 118 and the ODD 120 into the main memory 113. The various programs executed by the CPU 111 include a utility program 210, an OS 220 which manages resource control, and various application programs 230 which operate under the OS 220.

The CPU 111 also executes a BIOS program which is stored in the BIOS-ROM 117. The BIOS program is a program for hardware control.

The MCH 112 operates as a bridge which connects the CPU 111 with the ICH 114, and operates as a memory controller which controls access to the main memory 113. The MCH 112 also has a function of executing communication with the GPU 115.

The GPU 115 is a display controller which controls a display device that is incorporated in, or externally connected to, the information processing apparatus. The GPU 115 includes the VRAM 115A, and is equipped with an accelerator which draws an image to be displayed by the various programs in place of the CPU 111.

The ICH 114 includes a built-in ATA (AT Attachment) controller to control the HDD 118 and the ODD 120. The ICH 114 also controls the peripheral apparatuses 121 which are connected to a PCI (Peripheral Component Interconnect) bus. The ICH 114 also has a function of communicating with the sound controller 116.

The sound controller 116 is a sound source device, and outputs audio data to be played back by the various programs to the speakers 18A and 18B incorporated in the information processing apparatus, or externally connected speakers.

The EEPROM 122 is a memory device to store, for example, individual information and environment setting information of the information processing apparatus. The EC/KBC 123 is a one-chip MPU (Micro Processing Unit) obtained by integrating an embedded controller to control electric power of the computer 10 with a keyboard controller to control data input by operation of the keyboard 13 and the touch pad 16 or the like. The EC/KBC 123 has a function of turning on/off the power of the computer 10, in response to operation of the power button 14 by the user.

When an external electric power is supplied through an AC/DC adaptor 124A, the power controller 124 generates system power to be supplied to the components of the computer 10 by using the direct-current power supplied from the AC/DC adaptor 124A. When no external electric power is supplied through the AC/DC adaptor 124A, the power controller 124 generates system power to be supplied to the components of the computer 10 by using a battery 124B.

The open/close sensor 31 is a sensor which detects which of the open position and the closed position the display unit 12 is located in. The open/close sensor 31 senses the magnetic force from a permanent magnet provided in the computer main body 11, and thereby detects which of the open position and the closed position the display unit 12 is located in. When the display unit 12 is located in the open position, the open/close sensor 31 outputs an open signal to the EC/KBC 123. When the display unit 12 is located in the closed position, the open/close sensor 31 outputs a close signal to the EC/KBC 123.

The electric power of the computer 10 is controlled by ACPI (Advanced Configuration and Power Interface). System sleep states of the computer 10 are defined in the ACPI. System sleep states of S0, S3, S4, and S5 are used in the computer of the present embodiment. The larger the number attached to the symbol S is, the lower the power consumption of the computer 10 is.

The state S0 is an ordinary operation state (working state). The state S3 is a state which is called "sleep" or "suspended". The state S4 is a state which is called "standby" or "hibernation". The state S5 is a power-off state. In the following explanation, the states S3, S4 and S5 are also referred to as "power-saving state" together.

As a method of changing the apparatus from the state S0 to the power-saving state, there is a method in which the user selects a state to which the apparatus is to be changed, by using a user interface displayed on the display screen of the LCD 17 by the operating system. It addition, it is possible to change the apparatus to any of the states S0, S3, S4 and S5, by closing the display unit 12 or operating the power button 14 or the sleep button 15. FIG. 3 illustrates a setting picture for setting the action performed when the display unit 12 is closed, the action performed when the power button 14 is operated, and the action performed when the sleep button 15 is operated. As illustrated in FIG. 3, in the setting picture, it is possible to set actions which are different between the case where the computer 10 is driven by the battery 124B and the case where the computer 10 is driven by the AC/DC adaptor 124A. In the setting in the setting picture illustrated in FIG. 3, in the case of using the battery, the computer 10 is shut down and changes to the state S5 when the power button 14 is operated, the computer 10 is changed to the sleep state (S3) when the sleep button 15 is operated, and the computer 10 is changed to the sleep state (S3) when the display unit 12 is closed. In addition, in the setting in the setting picture illustrate in FIG. 3, in the case of using the power source, the computer 10 is shut down and changed to the state S5 when the power button 14 is operated, the computer 10 is changed to the sleep state (S3) when the sleep button 15 is operated, and the computer 10 is changed to the hibernation state (S4) when the display unit 12 is closed.

Even when the display unit 12 is closed by mistake, processing to change the computer to the sleep state is performed. When the display unit 12 is opened while the processing of changing the computer 10 to the sleep state is being performed, the computer 10 of the first embodiment is automatically changed to the ordinary state (S0).

FIG. 4 is a block diagram illustrating a structure for executing processing of automatically changing the computer to the ordinary state (S0), when the display unit 12 is opened after the display unit 12 is closed, in the computer 10 of the first embodiment.

As illustrated in FIG. 4, the computer 10 includes the open/close sensor 31, an EC 123A, a BIOS program 420, an ACPI module 430, the utility program 210, and the operating system 220 and the like. The BIOS program 420, the ACPI module 430, the utility program 210, and the OS 220 are programs which are executed by the CPU 111.

The embedded controller (EC) 123A is a module which is included in the EC/KBC 123 and configured to perform electric power control of the computer 10. The EC 123A receives an open signal and a close signal from the open/close sensor 31. When the signal from the open/close sensor 31 changes from an open signal to a close signal, a controller 401 notifies the BIOS program 420 that the display unit 12 is closed, by notification of an EC event. In addition, when the signal from the open/close sensor 31 changes from an open signal to a close signal, the controller 401 writes a value indicating that the display unit 12 is closed, in an open/close flag 411. When the signal from the open/close sensor 31 changes from a close signal to an open signal, the controller 401 writes a value indicating that the display unit 12 is opened, in the open/close flag 411. When the controller 401 is notified from the utility program 210 that processing of changing the computer to the power-saving state is performed since the display unit 12 is closed, the controller 401 changes the value of a flag 412 to a value which indicates "valid". When the controller 401 notifies the BIOS program 420 to turn on the power in the state where the value of the flag 412 is valid, the controller 401 changes the value of the flag 412 to a value which indicates "invalid".

When the controller 401 is notified from the BIOS program 420 that the computer is changed to the power-saving state, the controller 401 notifies the BIOS program 420 to turn on the power, when the value of the open/close flag 411 is a value which indicates "open" and the value of the flag 412 is a value which indicates "valid".

When the controller 401 is notified from the BIOS program 420 that the computer is changed to the power-saving state, the controller 401 notifies a power source management module 402 to perform power management in accordance with the power-saving state, when the value of the open/close flag 411 is a value which indicates "close" or the value of the flag 412 is a value which indicates "invalid". The power source management module 402 performs power management of the computer 10 in accordance with the notification.

When the BIOS program 420 is notified from the controller 401 of an EC event that the display unit 12 is closed, the BIOS program 420 issues an event to the ACPI module 430, and thereby notifies the ACPI module 430 that the display unit 12 is closed.

In addition, when the BIOS program is notified from the OS 220 to perform the power-saving processing, the BIOS program 420 executes processing to change the computer to the power-saving state. When the processing is finished, the BIOS program 420 notifies the EC 123A to perform the power-saving processing.

The ACPI module 430 notifies the utility program 210 that it is notified that the display unit 12 is closed, in accordance with the event issued from the BIOS program 420.

The utility program 210 obtains a setting 220A in the OS 220, in response to the notification from the ACPI module 430. The setting 220A indicates an action which is performed when the display unit 12 is closed. The setting 220A indicates one of "no action", "sleep state", "hibernation", and "shut down". When the setting 220A indicates one of "sleep state", "hibernation" and "shut down", the utility program 210 notifies the EC 123A of the state indicated by the setting 220A. When the setting 220A indicates one of "sleep state", "hibernation" and "shut down", the utility program 210 also notifies the OS 220 of the state indicated by the setting 220A.

After the OS 220 finishes the processing to change the computer to the power-saving state in response to the notification from the utility program 210, the utility program 210 notifies the BIOS program 420 to change the computer to the power-saving state.

Figure 5:
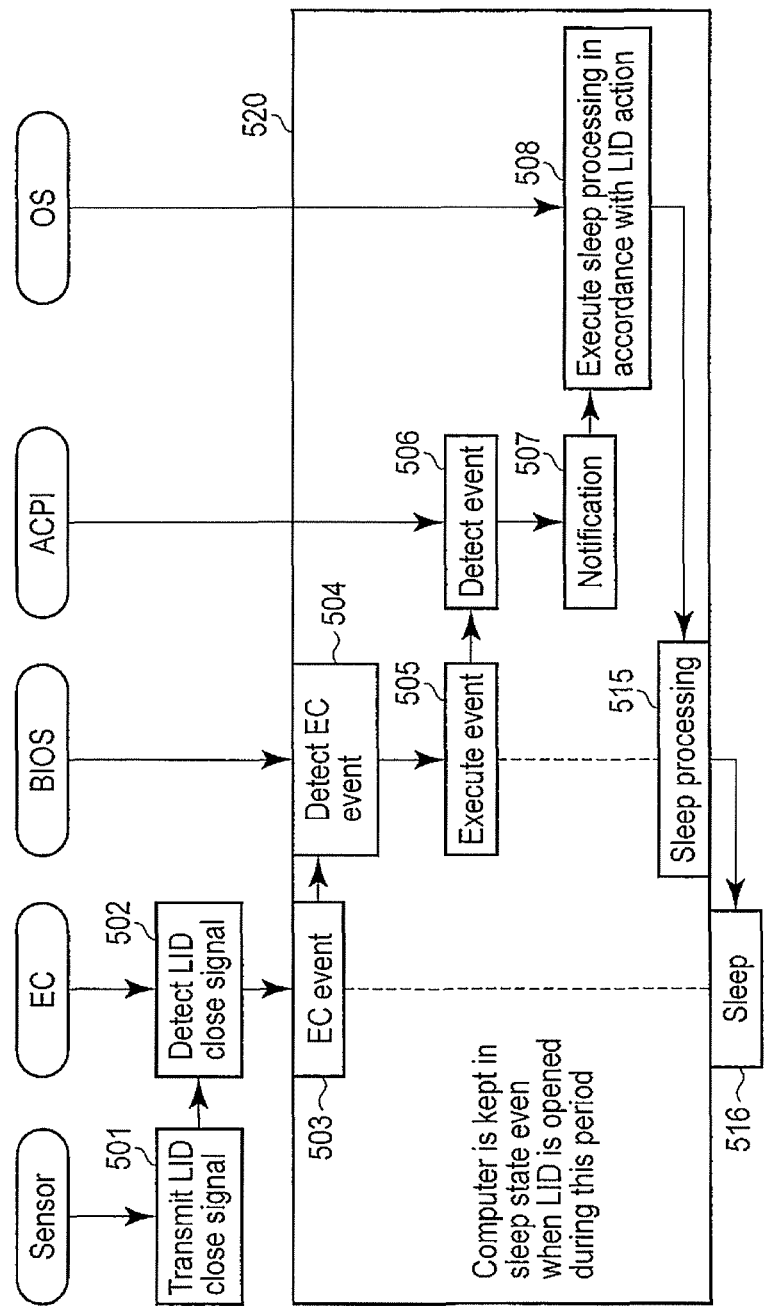
FIG. 5 is an exemplary flowchart illustrating a process of changing the apparatus to the power-saving state when the display unit is closed, in the case where there is no utility program illustrated in FIG. 4.

A processing of changing the computer 10 to a sleep state when the display unit 12 is closed in a computer which does not include utility program 210 of the present embodiment will be explained hereinafter with reference to FIG. 5.

When the LID 12 is closed, the open/close sensor 31 outputs a LID close signal to the EC 123A (Block 501). In response to reception of the LID close signal, the EC 123A detects that the LID 12 is closed (Block 502). The EC 123A notifies the BIOS program 420 of an EC event that the LID 12 is closed (Block 503). In response to detection of the EC event (Block 504), the BIOS program 420 notifies the ACPI module 430 of an event that the LID 12 is closed (Block 505). In response to detection of the event from the BIOS program 420 (Block 506), the ACPI module 430 issues a notification that the LID 12 is closed to the operating system 220 (Block 507). Since the "sleep state" is set as the LID action, the operating system 220 executes sleep processing (Block 508). The operating system 220 notifies the BIOS program 420 to change the computer to the sleep state. The BIOS program 420 performs processing to change the computer to the sleep state (Block 509). After the processing is finished, the BIOS program 420 notifies the EC/KBC 123 to change the computer to the sleep state. The EC/KBC 123 performs power management in accordance with the sleep state (Block 516).

Even when the user opens the LID 12 during the processing from detection of change of the LID by the EC 123A to execution of the sleep processing by the EC 123A (processing in a rectangle 520), the sleep processing is not discontinued, but the computer is kept in the sleep state although the LID 12 is opened.

Without the utility program 210, even when the EC 123A is notified to change the computer to the sleep state, it is impossible for the EC 123A to recognize whether change to the sleep state is caused by closing the LID 12, or by operating the sleep button 15 by the user. Therefore, the EC 123A cannot resume the computer from the sleep state, even when the LID 12 is opened after the LID 12 is closed.

Figure 6:
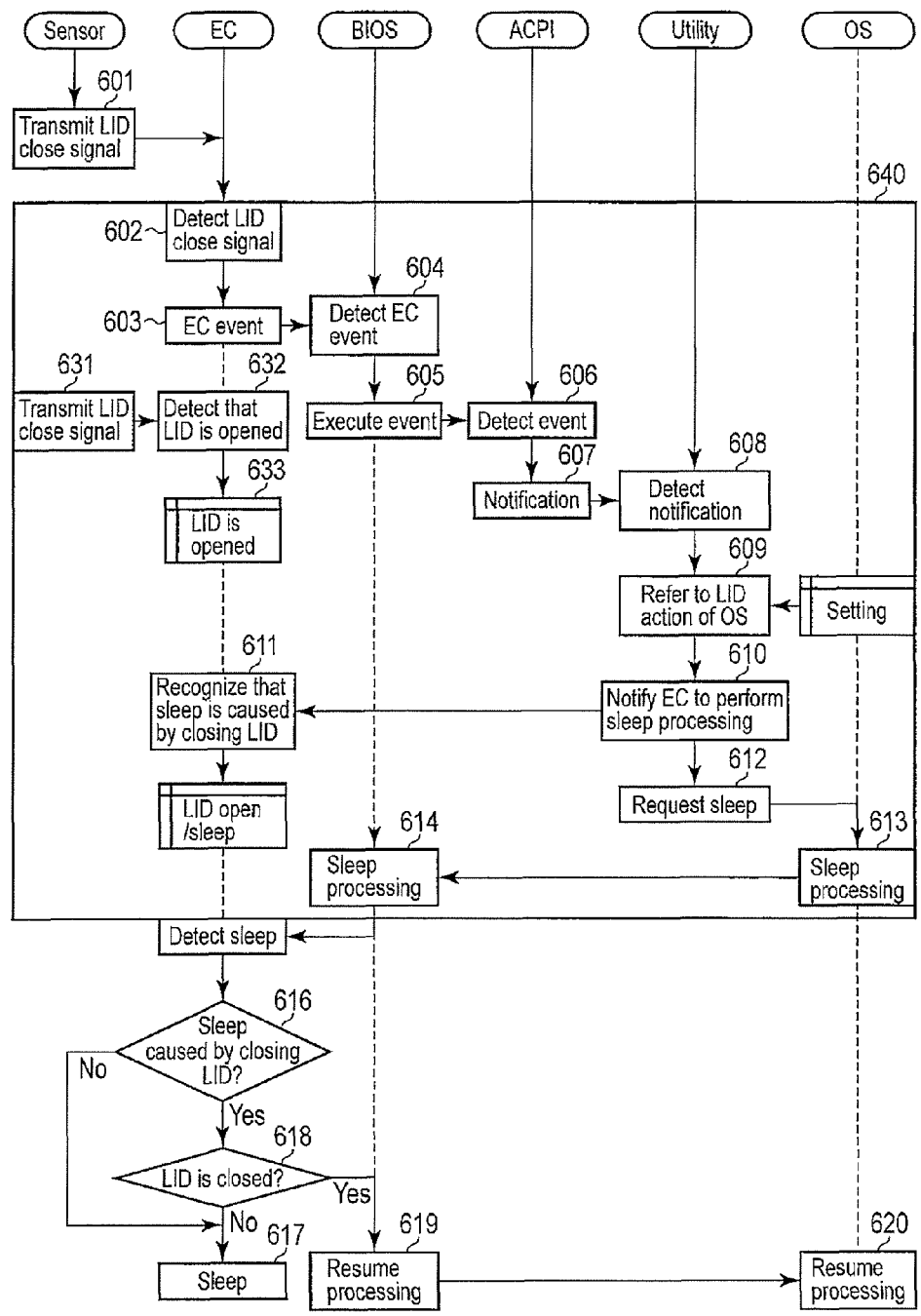
FIG. 6 is an exemplary flowchart illustrating a process of changing the apparatus to the power-saving state, which is performed by the information processing apparatus of the embodiment, when the display unit is closed.

Next, a process which is performed when the LID 12 is opened after the LID 12 is closed in the apparatus of the present embodiment will be explained hereinafter with reference to the flowchart of FIG. 6.

When the LID 12 is closed, the open/close sensor 31 outputs a LID close signal to the EC 123A (Block 601). In response to reception of the LID close signal, the EC 123A detects that the LID 12 is closed (Block 602). In response to detection of closing of the LID 12, the EC 123A notifies the BIOS program 420 of an EC event, and thereby notifies the BIOS program 420 that the LID 12 is closed (Block 603). The BIOS program 420 notifies the ACPI module 430 of an event in response to detection of the EC event from the EC 123A (Block 604), and thereby notifies the ACPI module 430 that the LID 12 is closed (Block 605). In response to detection of the event from the BIOS program 420 (Block 606), the ACPI module 430 issues a notification, which indicates that the LID 12 is closed, to the utility program 210 (Block 607). In response to detection of the notification from the ACPI module 430 (Block 608), the utility program 210 refers to the LID action on the operating system 220 (Block 609). Since the "sleep state" is set as the LID action, the utility program 210 notifies the EC/KBC 123 that sleep processing is performed since the LID 12 is closed (Block 610). The utility program 210 requests the operating system 220 to perform the sleep processing (Block 612).

By notification from the utility program 210, the EC 123A recognizes that the sleep processing is performed since the LID 12 is closed. The EC 123A changes the value of the flag 412 to a value which indicates "valid".

The operating system 220 performs the sleep processing in response to the notification from the utility program 210 (Block 613). The operating system 220 notifies the BIOS program 420 to change the computer to the sleep state. After the BIOS program 420 performs the sleep processing (Block 614), the BIOS program 420 notifies the EC 123A to change the computer to the sleep state.

The controller 401 of the EC 123A refers to the value of the flag 412, and determines whether the change to the sleep state is caused by closing the LID 12, in response to the notification from the BIOS program 420 (Block 616). When the value of the flag 412 is a value which indicates "invalid" and it is determined that the change to the sleep state is not caused by closing the LID 12 (No of Block 616), the controller 401 commands the power source management module 402 to perform power management in accordance with the sleep state, and thereby changes the computer to the sleep state (Block 617). When the value of the flag 412 is a value which indicates "valid" and it is determined that the change to the sleep state is caused by closing the LID 12 (Yes of Block 616), the controller 401 refers to the open/close flag 411, and determines whether the LID 12 is closed or not. When it is determined that the LID 12 is not closed (No of Block 618), the controller 401 commands the power source management module 402 to perform power control in accordance with the sleep state, and thereby changes the computer to the sleep state (Block 617). When it is determined that the LID 12 is closed (Yes of Block 618), the controller 401 notifies the BIOS program 420 to turn on the power. The BIOS program 420 executes resume processing in response to the notification from the controller 401 (Block 619). The BIOS program 420 notifies the operating system 220 to execute the resume processing. In response to the notification from the BIOS program 420, the operating system 220 executes the resume processing (Block 620).

When the LID 12 is opened during the process in a rectangle 640, the open/close sensor 31 transmits a LID open signal to the EC 123A (Block 631). In response to reception of the LID open signal, the EC 123A detects that the LID 12 is opened, in response to reception of the LID open signal (Block 632). The controller 401 writes a value, which indicates that the LID 12 is opened, in the open/close flag 411 (Block 413).

By the process explained above, it is possible to realize the processing of resuming the computer to the ordinary state (S0) when the LID 12 is opened during the sleep processing which is caused by closing the LID 12.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus which has an ordinary state and a power-saving state that has a power consumption lower than that of the ordinary state, the apparatus comprising:
    a body;
    a cover which is supported by the body, and capable of being opened and closed with respect to the body;
    a sensor to detect an open/close state of the cover;
    an electric power management controller to perform electric power management of the apparatus in accordance with the ordinary state and the power-saving state;
    a processor to (i) to the electric power management controller that processing for changing the apparatus to the power-saving state is performed since the cover is closed, if the sensor detects that the cover is closed and an action to be performed when the cover is closed indicates change to the power-saving state,
    (ii) request an operating system to change to the power-saving state, if the sensor detects that the cover is closed and the action to be performed when the cover is closed indicates the change to the power-saving state, and
    (iii) provide, to the electric power management module, a notice indicating changing of the apparatus to the power-saving state, when processing which is performed by the operating system to change the apparatus to the power-saving state is finished,
    wherein the electric power management controller turning on the apparatus in order to change the apparatus to the ordinary state, if the electric power management controller is notified that the processing for changing to the power-saving state is to be performed since the cover is closed and the sensor detects that the cover is opened, and
    wherein the electric power management controller performs an electric power management corresponding to the power-saving state according to the notice, if the electric power management controller is not notified that the processing for changing to the power-saving state is to be performed since the cover is closed, or if the electric power management controller is notified that the processing for changing to the power-saving state is to be performed and the sensor detects that the cover is closed.

2. The information processing apparatus of claim 1, wherein the cover comprises a display device.

3. The apparatus of claim 1, wherein the power-saving state is S3, S4, and S5, which are provided by ACPI (Advanced Configuration and Power Interface).

4. The apparatus of claim 1, further comprising:
    a button to change the apparatus to the power-saving state.

5. The apparatus of claim 1, wherein the operating system is configured to display a user interface to change the apparatus to the power-saving state, on a display device.

6. A method of controlling an information processing apparatus which has an ordinary state and a power-saving state that has a power consumption lower than that of the ordinary state, the apparatus comprising a body, a cover which is supported by the body and capable of being opened and closed with respect to the body, a sensor configured to detect an open/close state of the cover, and an electric power management controller to perform electric power management of the apparatus in accordance with the ordinary state and the power-saving state, the method comprising:
    notifying the electric power management controller that processing for changing the apparatus to the power-saving state is to be performed since the cover is closed, when the sensor detects that the cover is closed and an action which is to be performed when the cover is closed indicates change to the power-saving state;
    requesting an operating system to change to the power-saving state, when the sensor detects that the cover is closed and an action which is to be performed when the cover is closed indicates change to the power-saving state; and
    notifying the electric power management controller to change the apparatus to the power-saving state, when processing performed by the operating system to change the apparatus to the power-saving state is finished,
    turning on the apparatus in order to change the apparatus to the ordinary state according to the notifying of the electric power management controller to change the apparatus to the power-saving state, if the electric power management controller is notified that the processing for changing to the power-saving state is to be performed since the cover is closed and the sensor detects that the cover is opened; and performing an electric power management corresponding to the power-saving state, if the electric power management controller is not notified the that the processing for changing to the power-saving state is performed since the cover is closed, or if the electric power management controller is notified that the processing for changing to the power-saving state is to be performed since the cover is closed according to the notice and the sensor detects that the cover is closed.

7. The method of claim 6, wherein the power-saving state is S3, S4, and S5, which are provided by ACPI (Advanced Configuration and Power Interface).

8. The method of claim 6, wherein the apparatus further comprises a button to change the apparatus to the power-saving state.

9. The method of claim 6, wherein the operating system displays a user interface to change the apparatus to the power-saving state, on a display device.

10. An information processing apparatus which has an ordinary state and a power-saving state that has a power consumption lower than that of the ordinary state, the apparatus comprising:

a body;

a cover which is supported by the body, and capable of being opened and closed with respect to the body;

a sensor to detect an open/close state of the cover;

an electric power management controller to perform electric power management of the apparatus in accordance with the ordinary state and the power-saving state; and a processor that runs an operating system that places the apparatus into the power-saving state, if the sensor detects that the cover is closed and an action to be performed when the cover is closed indicates change to the power-saving state, wherein the electric power management controller turns on the apparatus in order to change the apparatus to the ordinary state, if the sensor detects that the cover is opened during processing for changing to the power-saving state being performed by the operating system.

* * * * *